(12) United States Patent
Rose

(10) Patent No.: US 10,604,331 B2
(45) Date of Patent: Mar. 31, 2020

(54) REUSABLE SPRAY APPARATUS

(76) Inventor: Damon Rose, Atlanta, GA (US)

(*) Notice: Subject to any disclaimer, the term of this patent is extended or adjusted under 35 U.S.C. 154(b) by 1070 days.

(21) Appl. No.: 13/166,783

(22) Filed: Jun. 22, 2011

(65) Prior Publication Data

US 2012/0153047 A1    Jun. 21, 2012

Related U.S. Application Data

(60) Provisional application No. 61/357,329, filed on Jun. 22, 2010, provisional application No. 61/344,678, filed on Oct. 18, 2010.

(51) Int. Cl.
*A62C 13/62* (2006.01)
*B65D 83/42* (2006.01)
*B65D 83/32* (2006.01)

(52) U.S. Cl.
CPC ............ *B65D 83/425* (2013.01); *B65D 83/32* (2013.01); *Y02W 30/807* (2015.05)

(58) Field of Classification Search
CPC ............. B05B 11/0037; B05B 11/0072; B05B 11/0081; B05B 7/0025; B05B 7/2435; B05B 7/2421; B65D 83/425; B65D 83/66; B65D 83/685; A62C 13/74
USPC ................. 239/303, 308, 338, 307, 337, 311
See application file for complete search history.

(56) References Cited

U.S. PATENT DOCUMENTS

| | | | | |
|---|---|---|---|---|
| 3,085,752 A | * | 4/1963 | Drell | B05B 7/2421 239/308 |
| 3,291,346 A | * | 12/1966 | Marraffino | B65D 83/685 222/136 |
| 3,326,469 A | * | 6/1967 | Abplanalp | B05B 7/063 239/308 |
| 3,632,045 A | * | 1/1972 | Oana | A62C 13/74 239/307 |
| 4,174,811 A | * | 11/1979 | Binder | B65D 83/66 141/20 |
| 7,789,278 B2 | * | 9/2010 | Ruiz de Gopegui | B05B 7/2435 222/136 |

* cited by examiner

*Primary Examiner* — Davis D Hwu

(57) ABSTRACT

A portable and reusable liquid spray apparatus, the spray apparatus configured to spray a liquid onto any surface. The apparatus has a spray housing which has a liquid chamber within. The liquid chamber having an opening into which a liquid may be poured and retained within the chamber. A propellant housing configured to engage the spray housing and form a first seal with the spray housing which precludes spillage of the liquid. The propellant housing holds a propellant having a pressure above atmospheric pressure. The propellant housing forms a second seal with the spray housing which precludes leakage of the propellant into the atmosphere. The spray housing also has a passage to supply the propellant into the liquid chamber. The spray housing includes a spray valve and a spray nozzle. The spray valve is configured for releasing the liquid from the apparatus thru the spray nozzle when the valve is actuated. Liquid to be sprayed is poured into the liquid chamber and the propellant housing is engaged with the spray housing. When the spray valve is actuated, the propellant forces the liquid thru the spray nozzle and out of the apparatus.

10 Claims, 13 Drawing Sheets

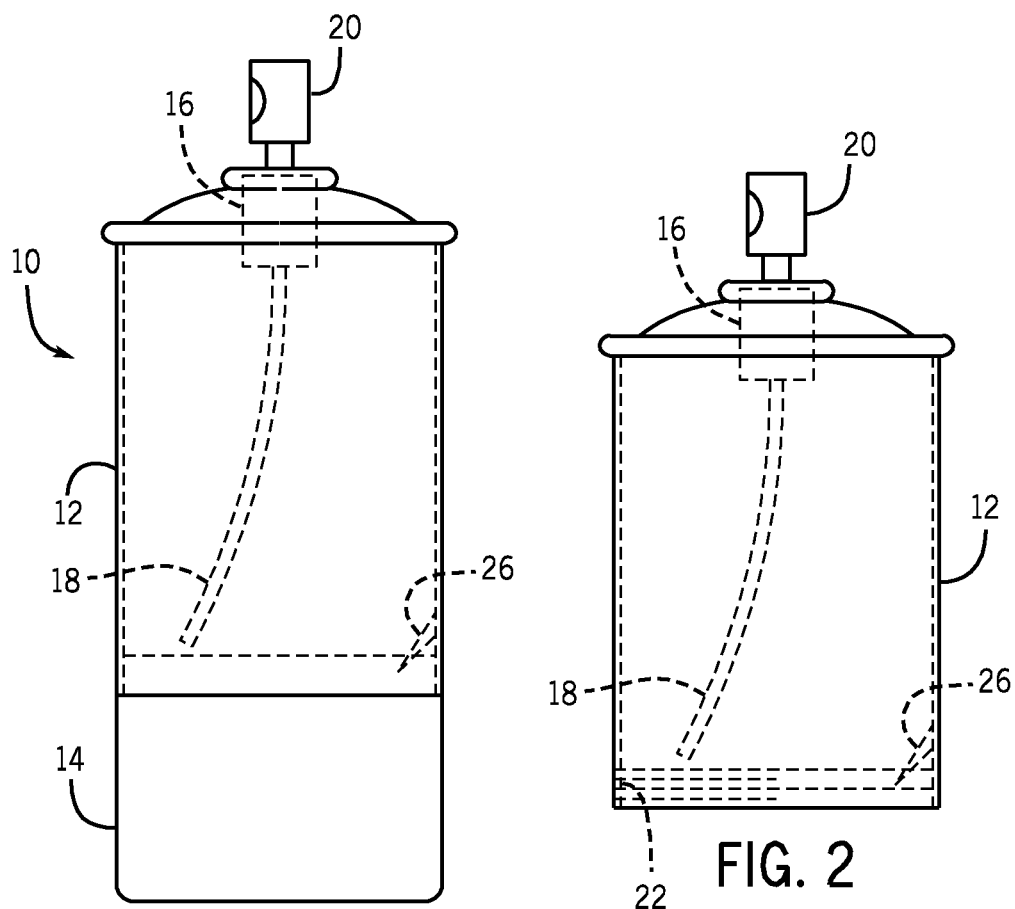
FIG. 1
FIG. 2
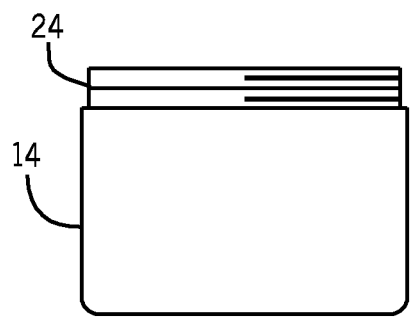
FIG. 3

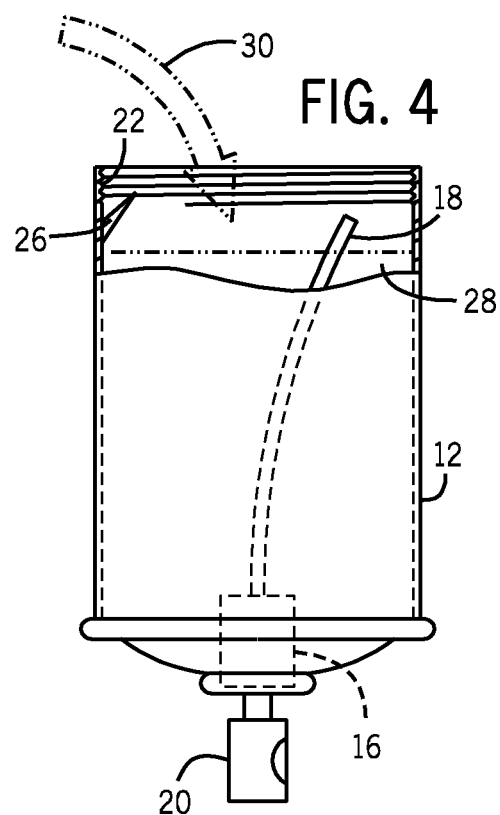
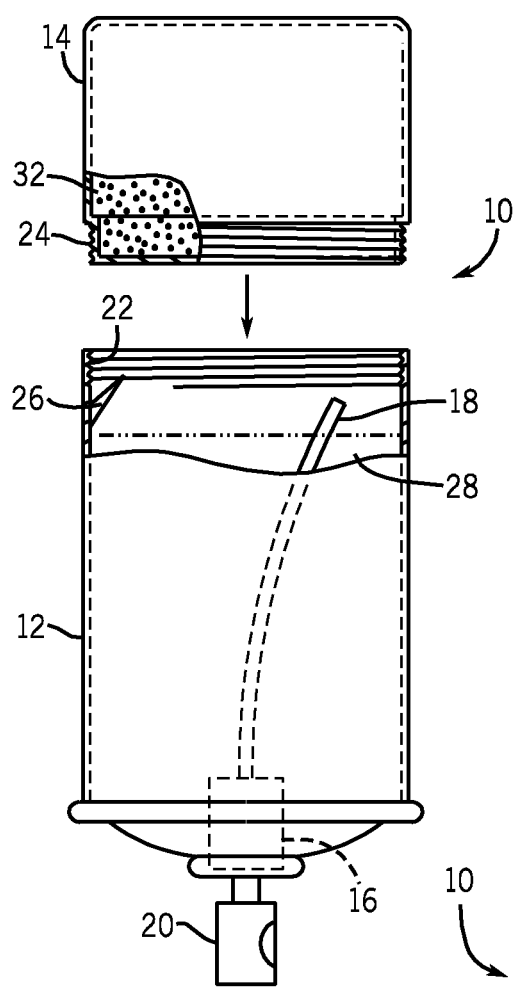
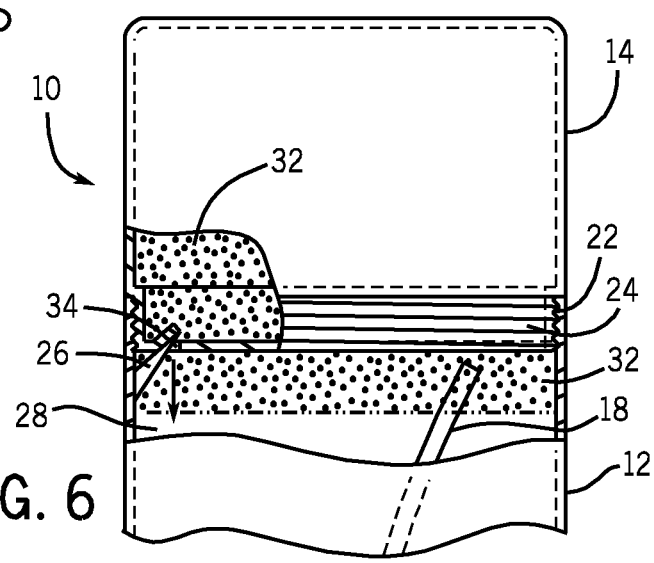

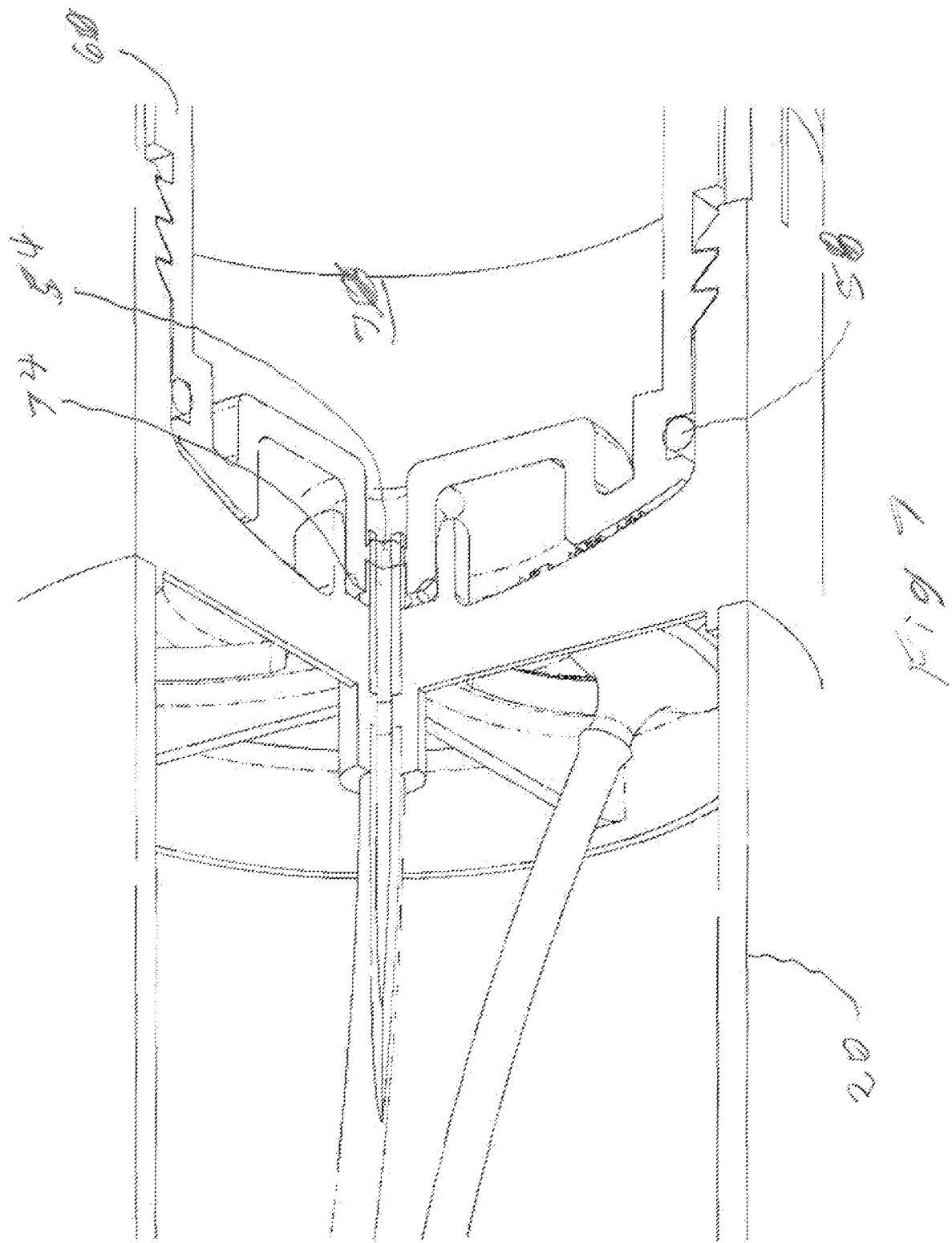

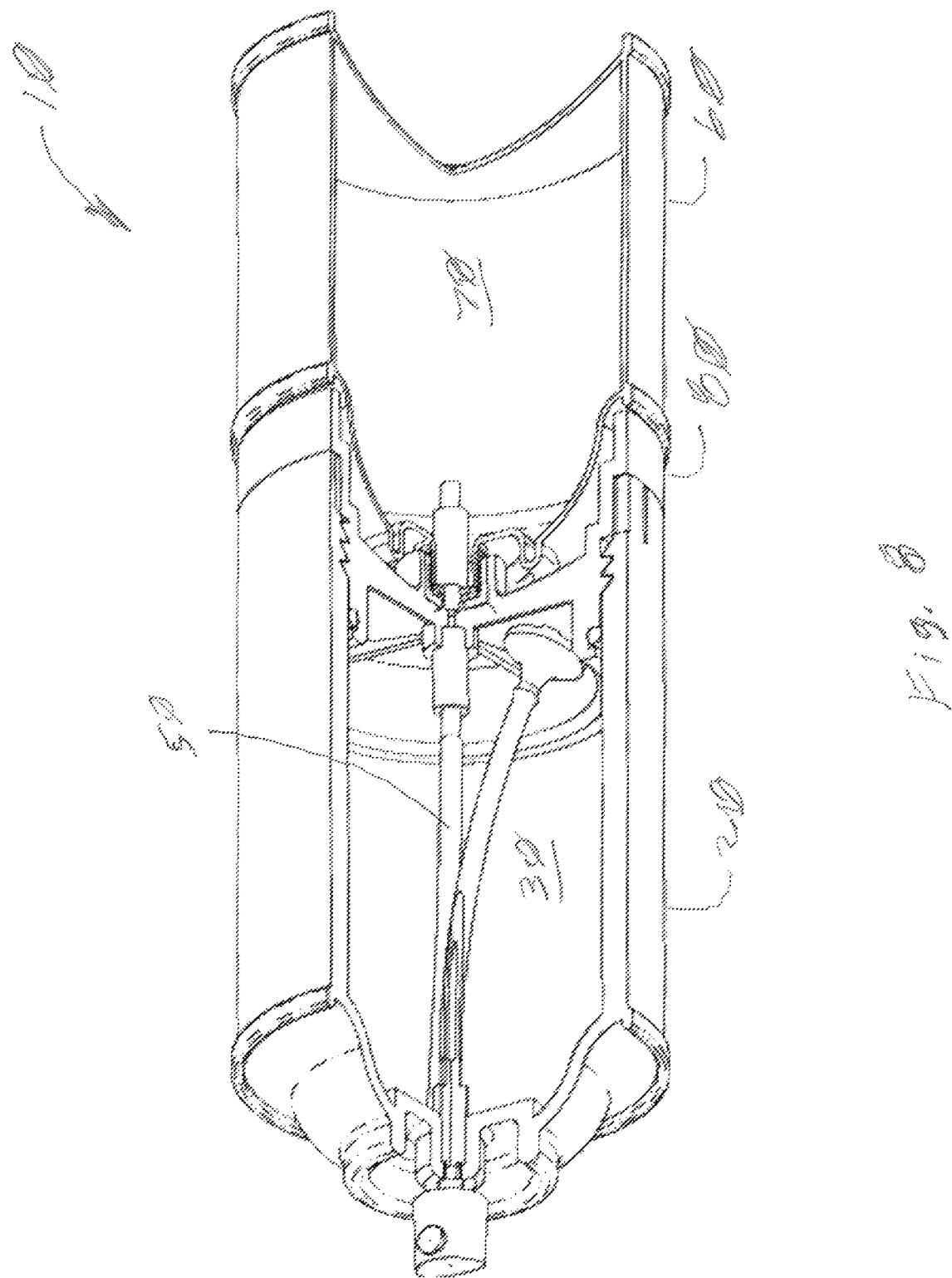

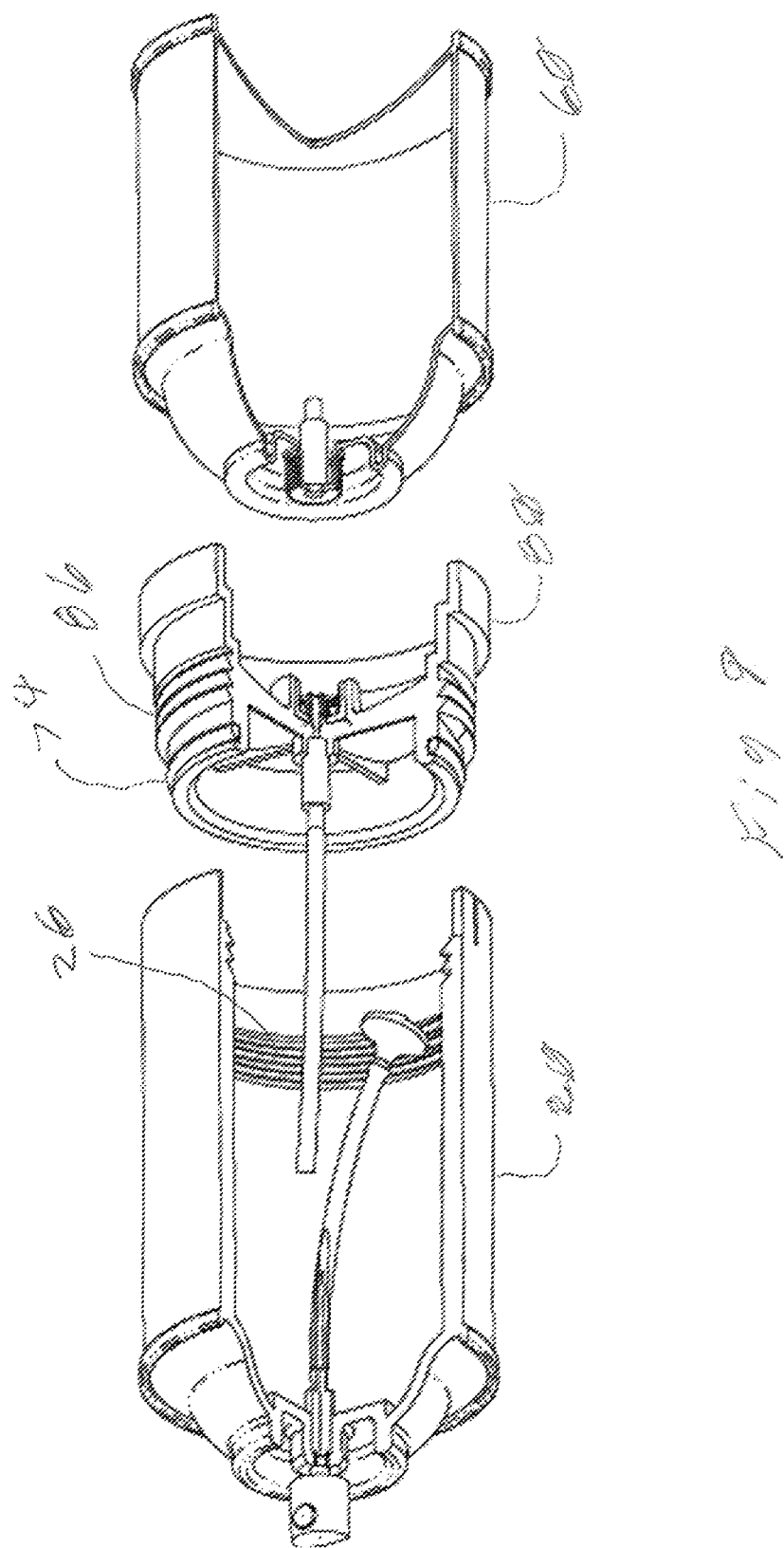

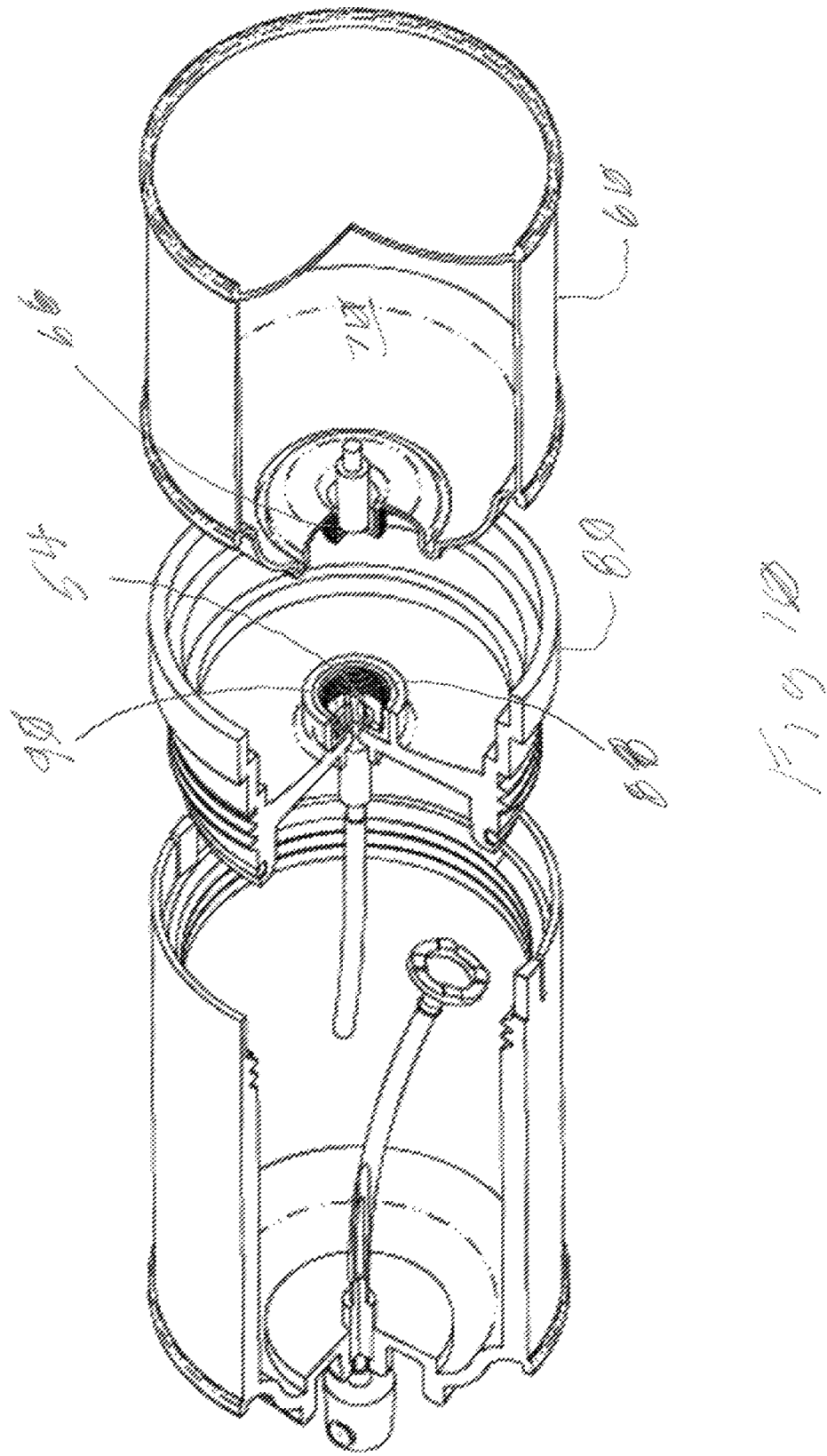

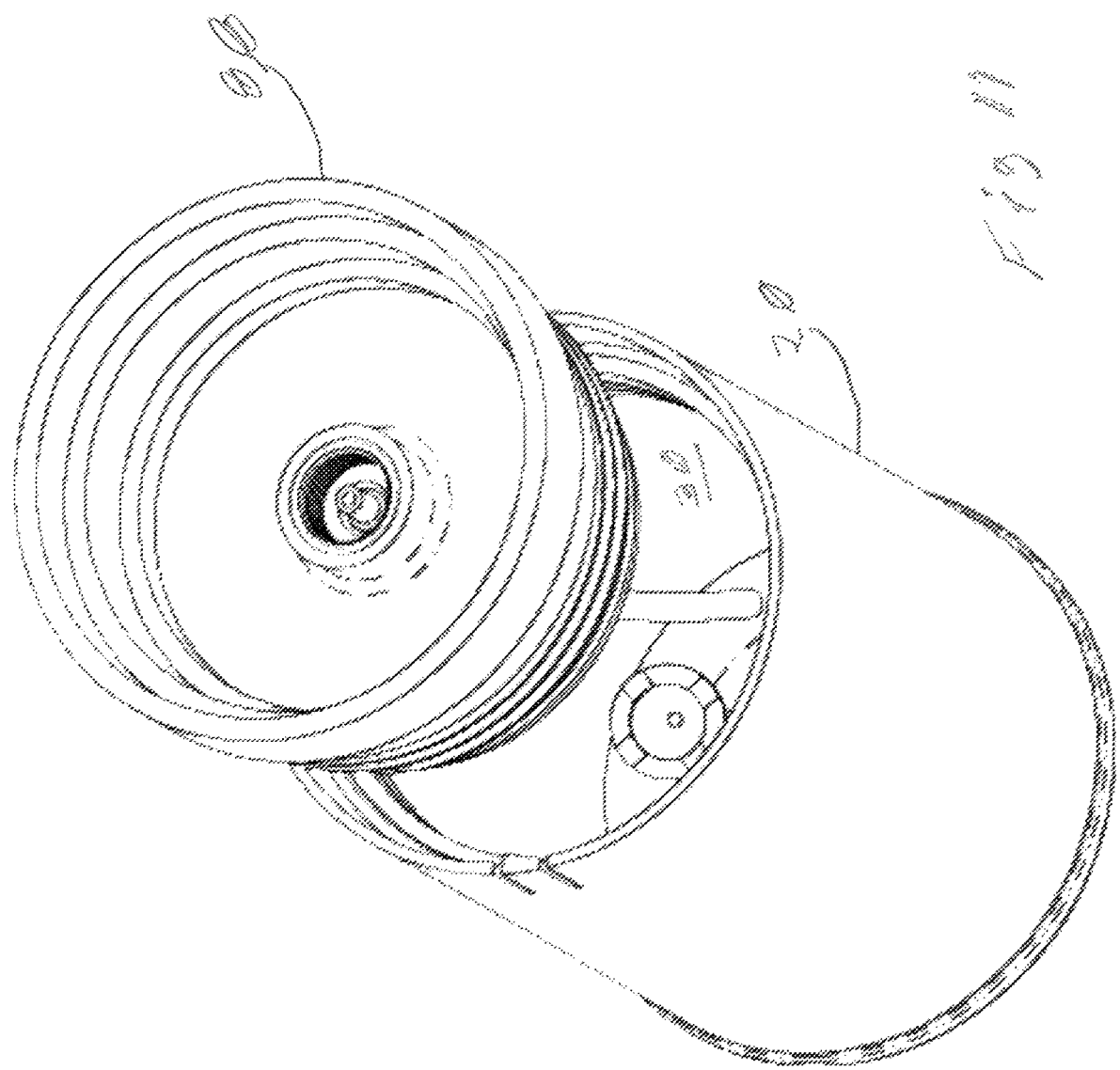

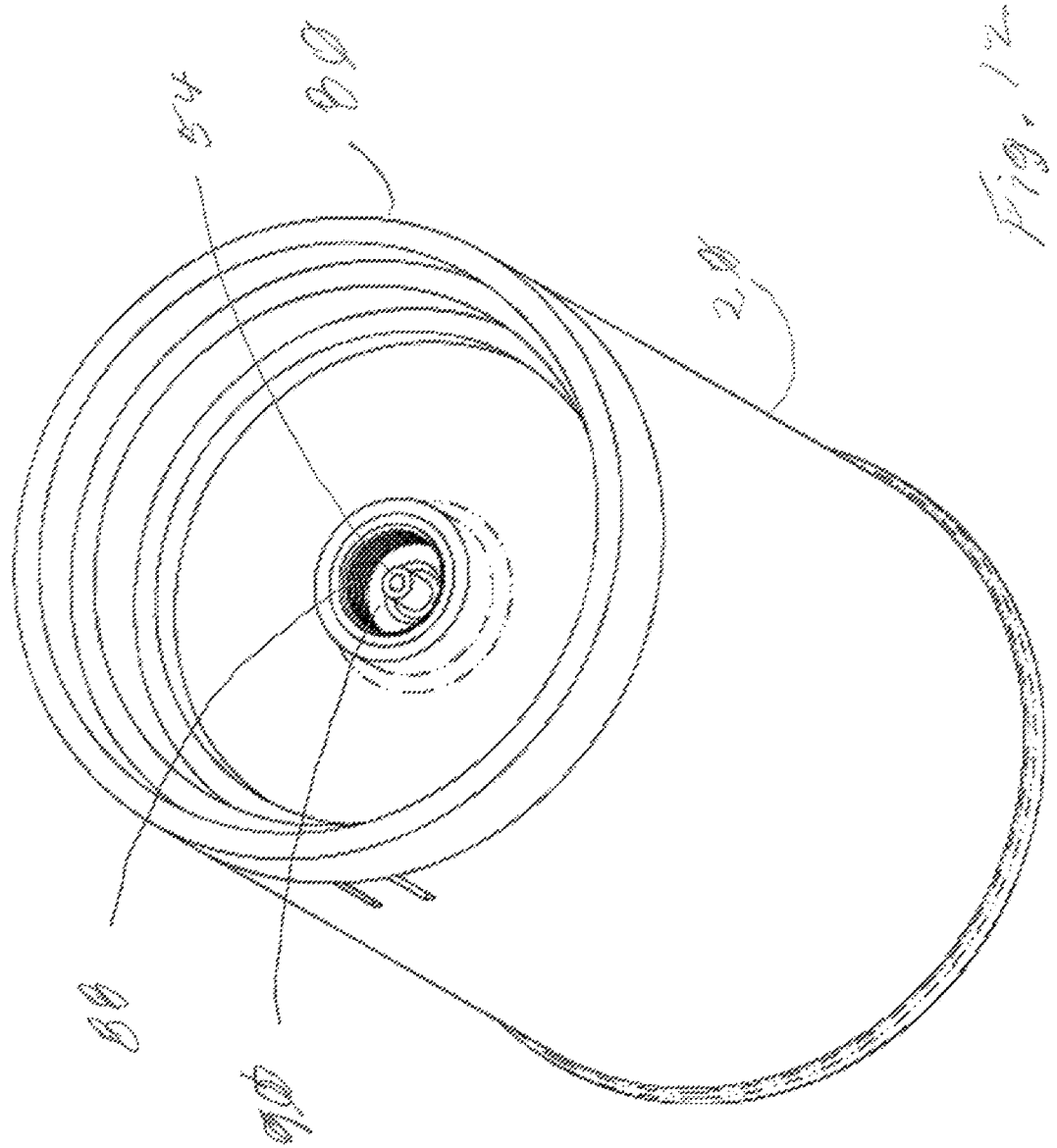

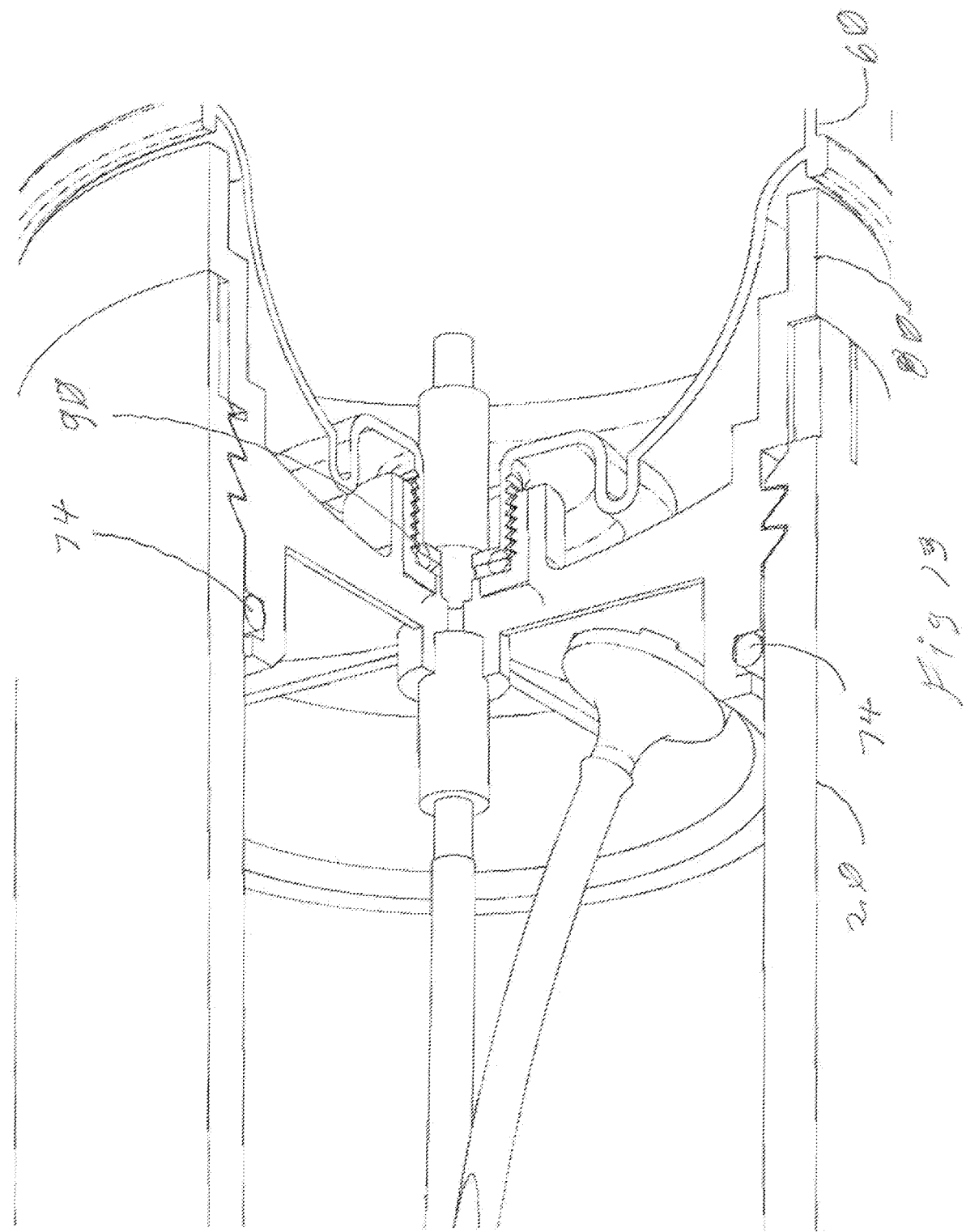

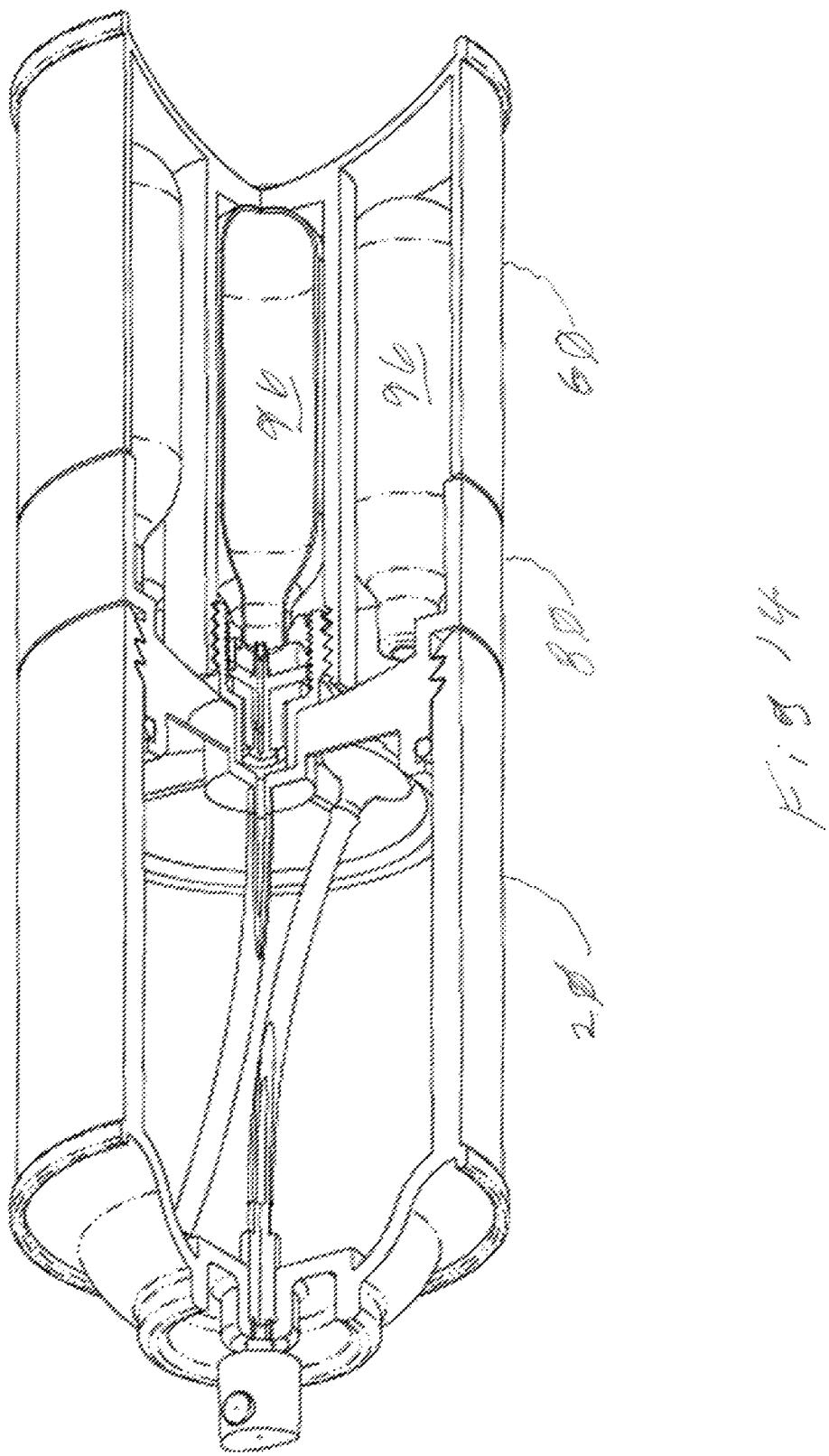

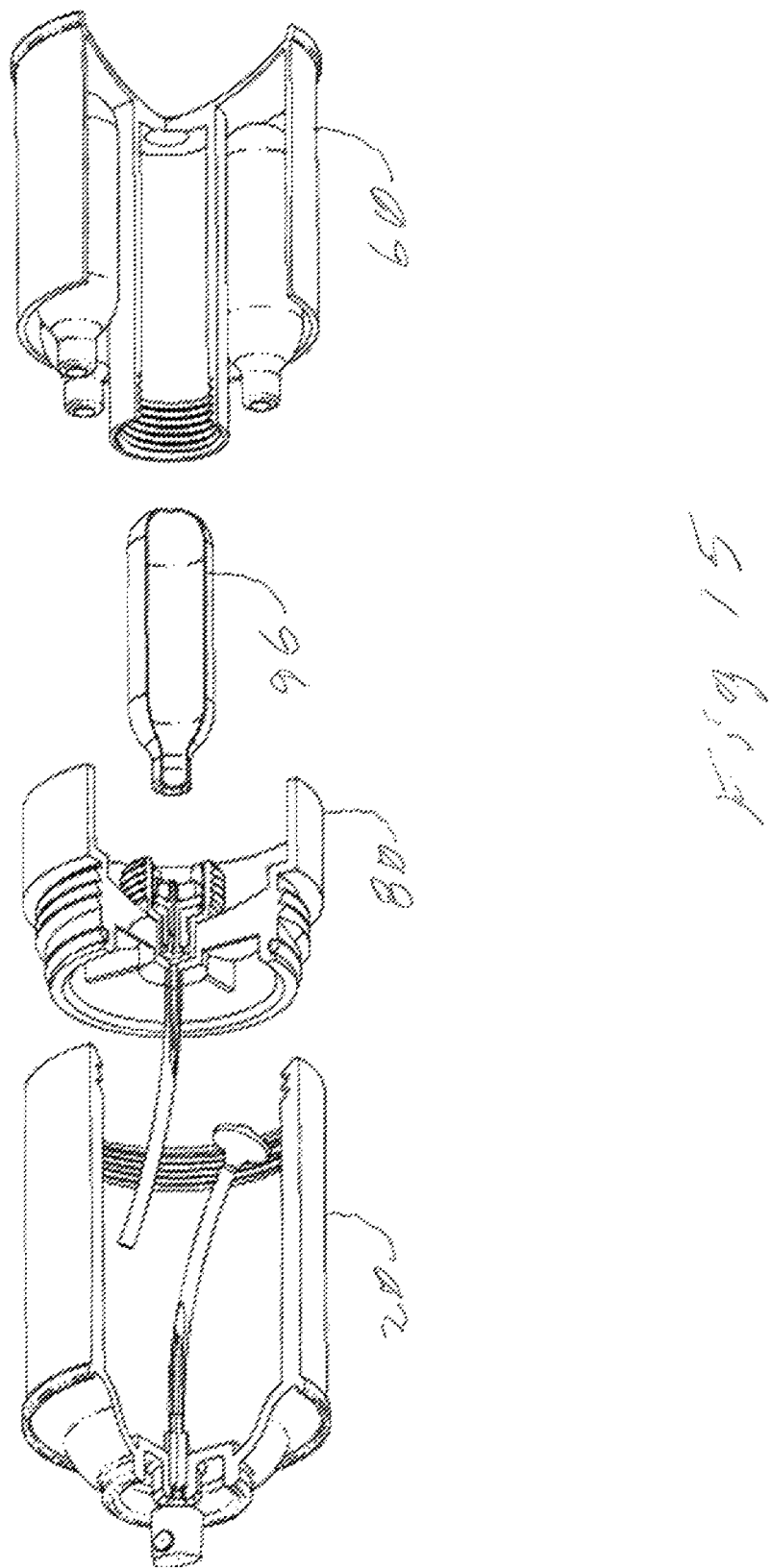

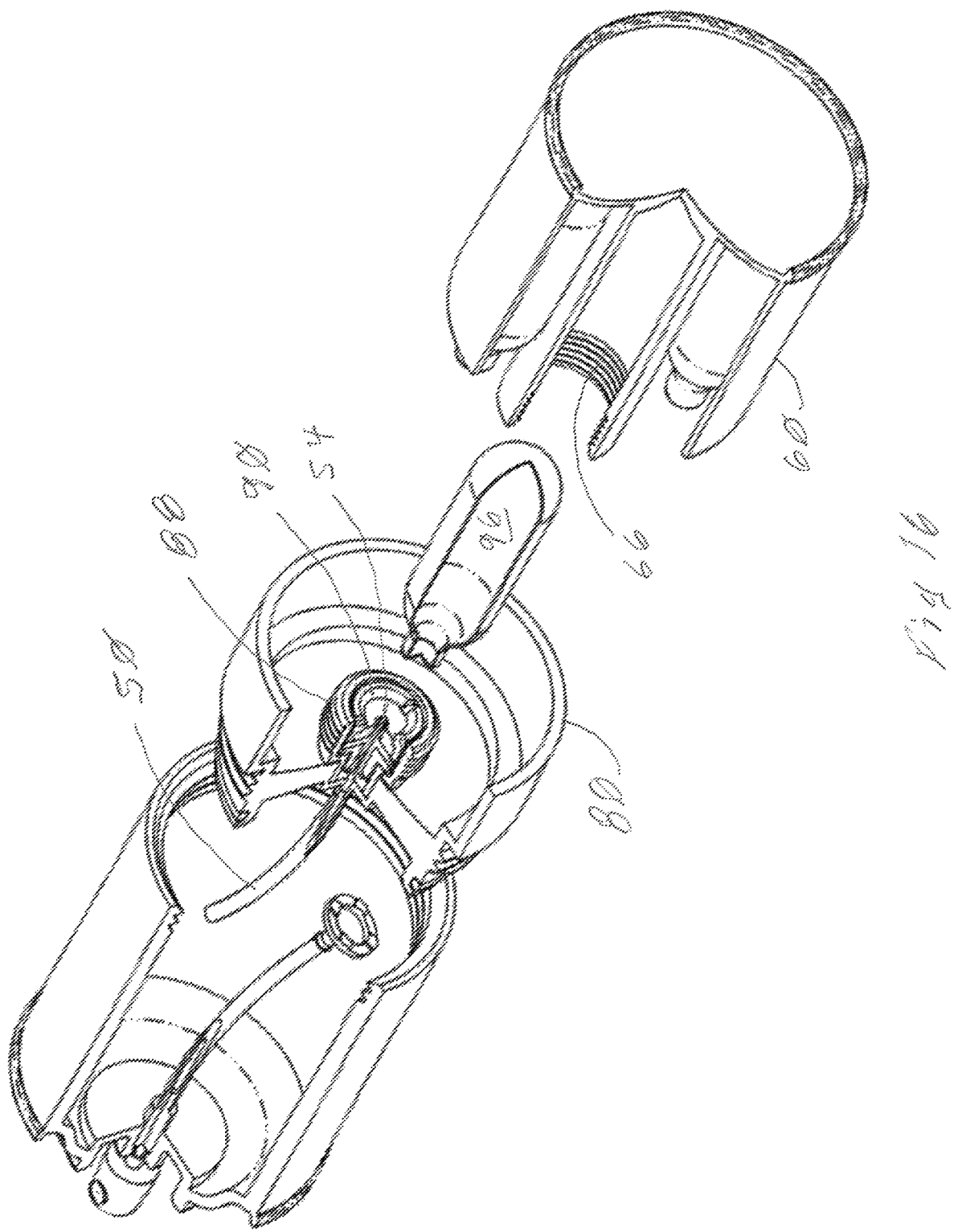

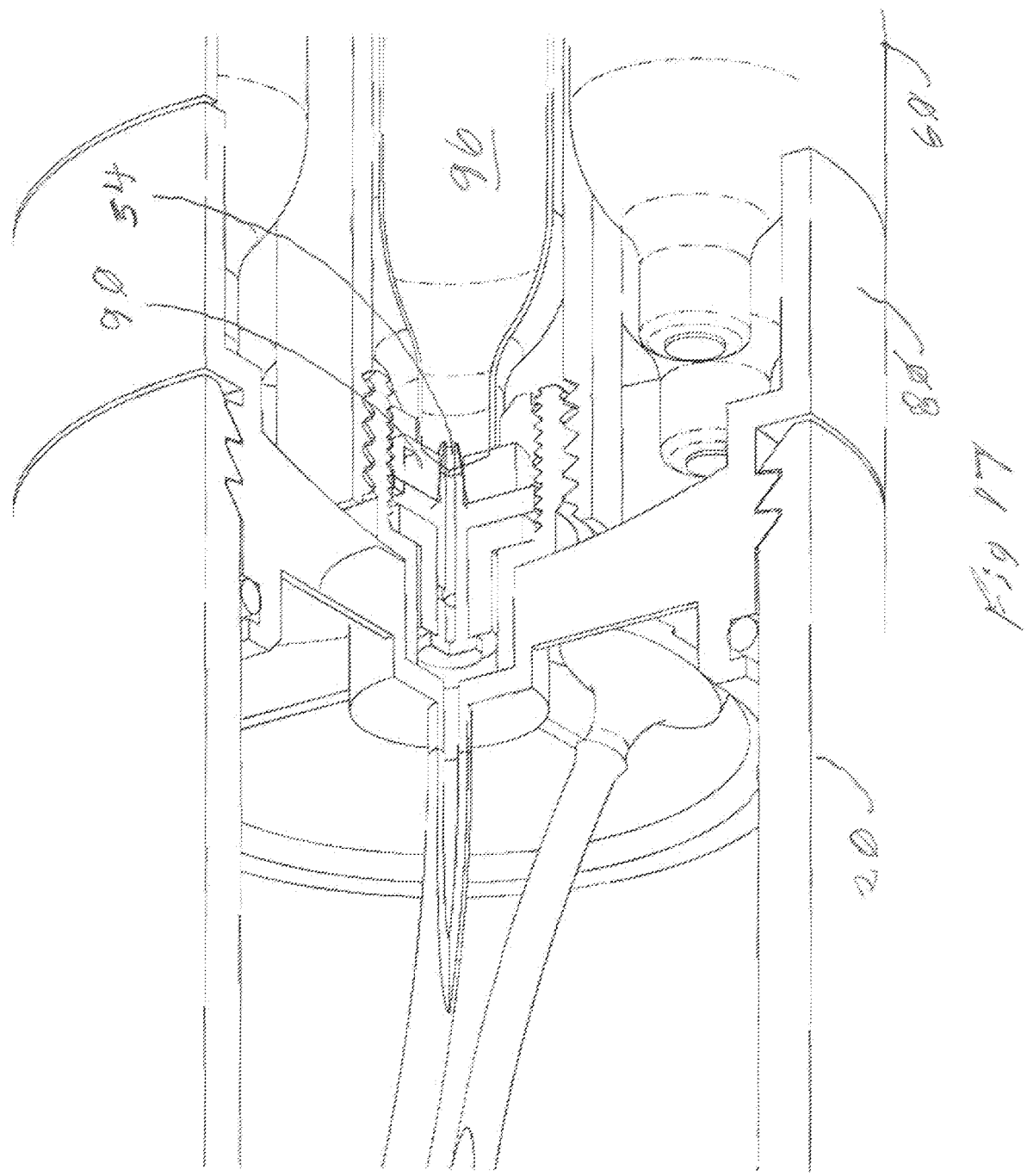

REUSABLE SPRAY APPARATUS

CROSS-REFERENCE TO RELATED APPLICATION

This application claims the benefit of U.S. Provisional Application Ser. No. 61/357,329, filed on Jun. 22, 2010 and U.S. Provisional Application Ser. No. 61/344,678, filed on Oct. 18, 2010, the entirety of each is hereby incorporated herein by reference.

BACKGROUND OF THE INVENTION

1. Field of the Invention

The present invention generally relates to an apparatus for spraying liquids. More particularly, the present invention relates to a portable and reusable apparatus that may be filled with a liquid and then the liquid sprayed upon a surface, the apparatus further capable of being refilled and reused multiple times.

2. Description of the Related Art

Many jobs within the commercial and private sector require the spraying of a liquid upon a surface. A few examples; a homeowner may need to paint an exterior garage door, a construction worker may need to apply a liquid sealant to a roofing membrane, a factory worker may need to apply a liquid anti-corrosion compound to a machine. In many situations, a spray application of the liquid is most efficient and results in better overall coverage of the substrate or surface as compared to brushing or rolling the liquid coating. A spray application readily covers all features of a compound surface shape and is independent of the surface finish, easily coating any nicks or cracks within the surface.

Aerosol spray cans provide a convenient way to apply some liquid compounds via spraying. Various paints, lubricants and adhesives are available in an aerosol spray form. However, in both the commercial and private sectors, many useful liquid compounds are not readily supplied within an aerosol container for spraying. Even when the liquid compound is offered in an aerosol spray package, the cost may be prohibitive when only a small quantity is needed for the application at hand.

The environmental impact of the aerosol spray containers is also problematic. The propellants used historically in spray containers were environmentally damaging to the atmosphere. Even with the application of modern, less atmospherically harmful propellants, the aerosol packaging presents an environmental waste and hazard. The body of the aerosol container may not be reused and is difficult to recycle. Often the spent aerosol containers end up in landfills. Hence the plastic and metal components of the aerosol package are used for a single application and then discarded.

The common method of spraying liquid compounds is the use of a spay gun and compressor. The compressor is typically electrically powered and provides pressurized air to the spray guy via a hose connection. A more modern solution to the spraying problem is the use of an "airless" sprayer. The airless sprayer uses a pump to pressurize the liquid and force it to spray from the device. The spray gun and compressor units, and the airless spray units, are more cumbersome to set-up and use when compared to a common aerosol can. This is especially true when a job is at hand requiring only a small quantity of liquid to be sprayed. Both units require an electrical supply at the jobsite, and are a substantial economic investment to purchase and maintain.

Due to the complexities and expense of existing spaying systems, it would be advantageous to provide an inexpensive spraying device. The spraying device should have a similar size, shape, and fluid capacity as that of an aerosol can. The operation of the device should be similar to that of using an aerosol can, and therefore be readily familiar to all users. The device should have the ability to readily accept a liquid compound within it, and then readily spray the compound upon a surface. The device should be self-contained with propellant and therefore highly portable. Unlike aerosol cans, the device should be reusable and refillable. During use, additional liquid compound should be able to be readily added to the device. After use, the device should be capable of being easily cleaned and readied for the next use where a different liquid compound may be loaded and sprayed. The propellant source should be both cost effective and readily replaceable to allow extended spraying sessions. It is thus to such a reusable and refillable spray apparatus that the present invention is primarily directed.

SUMMARY OF THE INVENTION

The disadvantages of the prior art are overcome by the present invention which, in one aspect, is a portable and reusable liquid spray apparatus, the spray apparatus configured to spray a liquid onto any surface. The apparatus has a spray housing which has a liquid chamber within. The liquid chamber having an opening into which a liquid may be poured and retained within the chamber. A propellant housing configured to engage the spray housing and form a first seal with the spray housing which precludes spillage of the liquid. The propellant housing holds a propellant having a pressure above atmospheric pressure. The propellant housing forms a second seal with the spray housing which precludes leakage of the propellant into the atmosphere. The spray housing also has a passage to supply the propellant into the liquid chamber. The spray housing includes a spray valve and a spray nozzle. The spray valve is configured for releasing the liquid from the apparatus thru the spray nozzle when the valve is actuated. Liquid to be sprayed is poured into the liquid chamber and the propellant housing is engaged with the spray housing. When the spray valve is actuated, the propellant forces the liquid thru the spray nozzle and out of the apparatus.

In another aspect of the present invention, the spray apparatus wherein the propellant includes an aerosol having a boiling point lower than 60 degrees Fahrenheit at atmospheric pressure. The aerosol includes at least one of; chlorofluorocarbon, propane, n-butane, isobutene, dimethyl ether, methyl ethyl ether, nitrous oxide, carbon dioxide, or hydrofluoroalkanes. The propellant may also include a pressurized gas of at least one of; carbon dioxide, argon, nitrogen, or helium. In another aspect, the pressurized gas is supplied by a $CO_2$ cartridge.

The first seal may include an O-ring between the spray housing and the propellant housing. The second seal may include an O-ring between the spray housing and the propellant housing. The spray housing may include a spike to release the propellant from the propellant chamber, and into the passage within the spray housing supplying the propellant into the liquid chamber, when the propellant housing is engaged with the spray housing. The spike puncturing the propellant chamber as the propellant housing is engaged with the spray housing. In another aspect of the present invention, the spike actuates a valve within the propellant housing releasing the propellant from the propellant chamber when the propellant housing is engaged with the spray housing.

In another aspect, the present invention is a portable and reusable liquid spray apparatus configured to spray a liquid onto any surface. The apparatus has spray housing with a liquid chamber inside. The liquid chamber forming an opening into which a liquid can be poured and retained within the liquid chamber. The apparatus has an adaptor housing configured to engage the spray housing. The adaptor housing forms a first seal with the spray housing which precludes spillage of the liquid from the liquid chamber.

A propellant housing configured to hold a propellant within a propellant chamber, the propellant having a pressure above atmospheric pressure. The propellant housing configured to engage the adaptor housing and thus forming a second seal with the adaptor housing. The second seal precluding leakage of the propellant into the atmosphere. The adaptor housing further includes a passage to supply the propellant into the liquid chamber of the spray housing. The spray housing further includes a spray valve and a spray nozzle, the spray valve configured for releasing the liquid from the apparatus thru the spray nozzle. Wherein liquid to be sprayed is poured into the liquid chamber and the adaptor housing is engaged with the spray housing and the propellant housing is engaged with the adaptor housing. When the spray valve is actuated, the propellant forces the liquid thru the spray nozzle and the liquid sprays out of the apparatus.

In another aspect of the present invention, the adaptor housing includes a spike to release the propellant from the propellant chamber of the base hosing and into the passage within the adaptor housing supplying the propellant into the liquid chamber, when the propellant housing is engaged with the adaptor housing. The spike punctures the propellant chamber when the propellant housing is engaged with the adaptor housing. In another aspect, the spike actuates a valve within the propellant housing releasing the propellant from the propellant chamber when the propellant housing is engaged with the adaptor housing. The first seal includes an O-ring between the spray housing and adaptor housing. The second seal includes an O-ring between the adaptor housing and the propellant housing.

In yet another aspect, the present invention presents a portable and reusable liquid spray apparatus configured to spray a liquid onto any surface. The apparatus has a spray housing with a liquid chamber inside. The liquid chamber forming an opening into which a liquid can be poured and retained within the liquid chamber. The apparatus has an adaptor housing configured to engage the spray housing and forming a first seal with the spray housing which precludes spillage of the liquid from the liquid chamber.

A propellant housing configured to hold a propellant cartridge. The propellant cartridge contains a propellant having a pressure above atmospheric pressure. The propellant housing further configured to engage the adaptor housing. The adaptor housing configured to engage the propellant cartridge forming a second seal with the propellant cartridge. The second seal precluding leakage of the propellant into the atmosphere. The adaptor housing includes a passage to supply the propellant into the liquid chamber of the spray housing. The spray housing further includes a spray valve and a spray nozzle. The spray valve configured for releasing the liquid from the apparatus thru the spray nozzle. Wherein liquid to be sprayed is poured into the liquid chamber and the adaptor housing is engaged with the spray housing and the propellant cartridge is engaged with the adaptor housing. When the spray valve is actuated, the propellant forces the liquid thru the spray nozzle and the liquid sprays out of the apparatus.

In yet another aspect of the present invention, the propellant cartridge is a CO2 cartridge. And the propellant cartridge has a male thread which engages a female thread within the adaptor housing.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE DRAWINGS

FIG. 1 is a perspective view of the reusable spray device.

FIG. 2 is a perspective cutaway view of the spray device of FIG. 1

FIG. 3 is a perspective cutaway view of the spray device of FIG. 1

FIG. 4 is a perspective cutaway view of the spray device of FIG. 1

FIG. 5 is a perspective view of the spray housing.

FIG. 6 is a perspective view of the propellant housing.

FIG. 7 is a perspective cutaway view of the spray housing mated with the propellant housing.

FIG. 8 is a perspective cutaway view of an alternative embodiment of the reusable spray device.

FIG. 9 is a perspective cutaway view of the embodiment of FIG. 8 depicting the spray housing, the adaptor housing, and the propellant housing disengaged.

FIG. 10 is a perspective cutaway view of the embodiment of FIG. 8 depicting the propellant housing disengaged from the adaptor housing.

FIG. 11 is a perspective view of the de-mated spray housing and adaptor housing.

FIG. 12 is a perspective view of the mated spray housing and adaptor housing.

FIG. 13 is a perspective cutaway view of the embodiment of FIG. 8 with the spray housing, the adaptor housing, and propellant housing mated together.

FIG. 14 is a perspective cutaway view of another alternative embodiment of the present invention.

FIG. 15 is a perspective cutaway view of the embodiment of FIG. 14 depicting the spray housing, the adaptor housing, and the propellant housing de-mated.

FIG. 16 is a perspective cutaway view of the embodiment of FIG. 14 depicting the propellant housing de-mated from the adaptor housing.

FIG. 17 is a perspective cutaway view of the embodiment of FIG. 14 depicting the spray housing, the adaptor housing, and propellant housing mated.

DETAILED DESCRIPTION OF THE INVENTION

The reusable and refillable spray apparatus provides and efficient and effective solution for spraying liquid compounds. The device has a similar size, shape, fluid capacity, and method of operation as that of an aerosol can and is therefore readily familiar to all users. The device has the ability to accept a liquid compound and then readily spray the compound upon a surface. The device is self-contained with propellant and highly portable. During a spraying session, additional liquid compound may be readily added to the device. After use, the device is easily cleaned and readied for the next use where a different liquid compound may be loaded and sprayed. The propellant source is cost effective and readily replaceable allowing extended spraying sessions.

With reference to the figures in which like numerals represent like elements throughout, FIG. 1 is a perspective view of one embodiment of the reusable spray device 10. The spray device 10 has the basic appearance and dimensions of a common aerosol can. The spray device, or apparatus, is depicted ready for use with a spray housing 20 engaged with a propellant housing 60. The unit is operated by pressing down upon spray nozzle 24 to spray the liquid from the apparatus in a manner analogous to the use of a common aerosol can.

FIG. 2 is a perspective cutaway view of the spray device of FIG. 1 depicting the spray housing 20 engaged with the propellant housing 60. The spray housing 20 has a liquid chamber 30 for receiving the liquid compound to be sprayed. The propellant housing 60 has a propellant chamber 70 which contains a propellant. A propellant supply tube 50, or passage, is in fluid connection with the propellant chamber 70 and supplies the propellant, and the propellant pressure, to the upper portion of the liquid chamber 30. The device 10 also has a spray nozzle 24 which can actuate a spray valve 40. A liquid supply tube 34 extends from the spray valve to the bottom of the liquid chamber 30. In operation, the liquid chamber 30 is filled with the desired liquid to be sprayed. A propellant applies pressure to the upper portion of the liquid chamber 30. The spray nozzle 24 is depressed actuating the spray valve 40. The propellant pressure applied to the upper portion of the liquid chamber 30 forces the liquid up thru the liquid tube 30, spray valve 40, and finally spraying out the spray nozzle 24.

FIG. 3 is a perspective cutaway view of the spray device of FIG. 1 depicting the propellant housing 60 disengaged from the spray housing 20. Male threads 66 on the periphery of the propellant housing 60 are configured to engage with female threads 26 on the interior of the spray housing 20. An O-ring seal 74 is captured within a grove on the propellant housing 60. After the liquid compound to be sprayed is poured within liquid chamber 30 of the spray housing 20, the propellant housing 60 closes off the opening and seals the liquid within the liquid chamber 30. The threaded connection provides a ready means to engage and disengage the propellant housing from the spray housing. In use, the O-ring 74 provides a positive seal between the engaged, or mated, propellant and spray housings. Moreover, the O-ring sealing integrity is not degraded with multiple mate and de-mate cycles of the propellant and spray housings.

FIG. 4 is a perspective cutaway view of the spray device of FIG. 1 depicting the propellant housing 60 disengaged or de-mated from the spray housing. The spray housing 20 has a hollow spike 54 which extends out along the central axis of the housing. The hollow spike is in fluid connection with the propellant supply tube 50. As used herein, fluid includes gases and liquids and combinations thereof. As used herein, fluid connection is defined as the ability to transfer a fluid and the fluid pressure. As used herein, a passage is any configuration for forming a fluid connection, including, but not limited to, a tube, or a recess. As the propellant housing 60 is fully engaged with the spray housing 20, the spike 54 pierces the propellant housing 60 and extends into the propellant chamber 70. The propellant and propellant pressure are then in fluid connection with the propellant supply tube 50 and the liquid chamber 30.

As will be appreciated by those skilled in the art, other means may be used to supply the propellant and propellant pressure from the propellant housing 60 to the liquid chamber 30. In an alternative embodiment, the propellant housing 60 may include a valve. The valve may be actuated by the spike 54 as the propellant and spray housings are engaged. The spike actuated valve allowing the propellant and propellant pressure to pass into the propellant supply tube 50. In this embodiment, the spike may be a hollow tube, or may be a simple pin which actuates the valve within propellant housing. When the propellant and spray housings are de-mated, the spike will be withdrawn, and the valve will reseat, thus sealing the propellant chamber 70 and preventing the loss of unused propellant. In this embodiment, the propellant housing 60 may be readily removed from the spray housing 20 to re-fill the device with fresh spray liquid without losing propellant.

As will be further appreciated by those skilled in the art, any propellant having a pressure above atmospheric pressure may be used within the device. Propellants may include, but are not limited to; chlorofluorocarbon, propane, n-butane, isobutene, dimethyl ether, methyl ethyl ether, nitrous oxide, carbon dioxide, or hydrofluoroalkanes. The proceeding propellants, singularly or in combination, are commonly referred to as aerosols, having a boiling point much lower than 60 degrees Fahrenheit. In use, the propellant will be in both a liquid and gaseous form within the propellant chamber. As propellant is vented during spraying, more of the liquid propellant will flash to vapour until the vapour pressure of the propellant is re-established within the propellant chamber. The vapour pressure of the aerosol will thus maintain a relatively constant pressure within the propellant chamber as the propellant is expended. In an alternative embodiment of the present invention, the propellant may be in the form of a compressed gas such as carbon dioxide, argon, nitrogen, helium, or other inert gas.

As will be appreciated by those skilled in the art, the most effective orifice size of the spray nozzle will vary depending upon the viscosity of the liquid being sprayed. The spray pattern desired for various jobs may also be different, wherein one application may require a tight focused spray, another application may require a fan shaped, broad coverage spray. The device may include a plurality of spray nozzles, each having a different orifice size or spray pattern. The spray nozzles are readily replaceable upon the device by pulling the current nozzle out of the spray valve, and inserting a new nozzle.

FIG. 5 is a perspective view of the spray housing 20. As depicted in FIG. 5, the spray housing has a spike 54 for piercing into, or actuating a valve within, the propellant housing 60. The spike 54 is situated within a cylindrical recess 52. An O-ring 58 is captured within a groove within the recess 52. As further depicted in FIG. 5, the liquid chamber 30 may be filled by inverting the spray housing 20 and pouring the liquid to be sprayed within the chamber 30. The chamber should not be overfilled with liquid to prevent spillage when the spray housing is joined with the propellant housing.

FIG. 6 is a perspective view of the propellant housing 60. As depicted in FIG. 6, the propellant housing 60 has a cylindrical protrusion 62. The diameter of the protrusion 62 tapers down from bottom to top as viewed in FIG. 6. As the propellant housing 60 mates with the spray housing 20, the protrusion 62 is driven into the recess 52. The O-ring 58 is squeezed and provides a positive seal between the engaged, or mated, propellant and spray housings. The O-ring sealing integrity is not degraded with multiple mate and de-mate cycles of the propellant and spray housings.

FIG. 7 is a perspective cutaway view of the spray housing 20 mated with the propellant housing 60. As depicted in FIG. 7, the O-ring 58 is compressed between the mated spray and propellant housings. The O-ring 74 is compressed between the recess 52 and the protrusion 62. The spike 54 extends into the propellant housing 60 and pierces into, or actuates a valve within, the propellant housing.

FIG. 8 is a perspective cutaway view of another alternative embodiment of the present invention. The embodiment of FIG. 8 uses a spray housing 20 which is engaged with an adaptor housing 80. The adaptor housing 80 is then engaged with the propellant housing 60. The spray housing 20 has a liquid chamber 30 for receiving the liquid compound to be sprayed. The propellant housing 60 has a propellant chamber 70 which contains a propellant. A propellant supply tube 50, or passage, is in fluid connection with the propellant chamber 70 and supplies the propellant, and the propellant pressure, to the upper portion of the liquid chamber 30. The configuration of the device is otherwise similar to the device of FIG. 1.

FIG. 9 is a perspective cutaway view of the spray device of FIG. 8 depicting the adaptor housing 80 disengaged from the spray housing 20, and the propellant housing 80 disengaged from the adaptor housing 80. Male threads 86 on the periphery of the adaptor housing 80 are configured to engage with female threads 26 on the interior of the spray housing 20. An O-ring seal 74 is captured within a grove on the adaptor housing 80. After the liquid compound to be sprayed is poured within liquid chamber 30 of the spray housing 20, the adaptor housing 80 closes off the opening and seals the liquid within the liquid chamber 30.

FIG. 10 is a perspective cutaway view of the spray device of FIG. 8 depicting the propellant housing 60 disengaged or de-mated from the adaptor housing 80. Male threads 66 on the periphery of the propellant housing 60 are configured to engage with female threads 88 on the interior of the adaptor housing 80. A seal 90 is captured within the adaptor housing 80. The adaptor housing 80 has hollow spike 54 which extends out along the central axis of the housing. The hollow spike is in fluid connection with the propellant supply tube 50. As the propellant housing 60 is fully engaged with the adaptor housing 80, the hollow spike 54 pierces the propellant housing 60 and into the propellant chamber 70. The propellant, and the propellant pressure, are then in fluid connection with the propellant supply tube 50 and the liquid chamber 30. The seal 80 may be of a compression or gasket type, or may be of an O-ring configuration, or a combination of the two, or may be of any other configuration as are readily known to those skilled in the art.

As will be appreciated by those skilled in the art, other means may be used to supply the propellant, and the propellant pressure, from the propellant housing 60 to the liquid chamber 30. In an alternative embodiment, the propellant housing 60 may include a valve. The valve may be actuated by the spike 54 as the propellant and spray housings are engaged. The spike actuated valve allowing the propellant, and the propellant pressure, to pass into the propellant supply tube 50. When the propellant and adaptor housings are de-mated, the spike will be withdrawn, and the valve will reseat, thus sealing the propellant chamber 70 and preventing the loss of unused propellant. In this embodiment, the propellant housing 60 may be readily removed from the adaptor housing 80, and the adaptor housing 80 removed from the spray housing 20 to re-fill the device with the liquid being sprayed without losing propellant. In this embodiment, the propellant housing 60 may be removed and replaced with a new propellant housing 60 with the adaptor housing 80 remaining engaged with the spray housing. The liquid to be sprayed is captured within the mated spray and adaptor housing and no risk of spillage is incurred in the propellant replacement.

FIG. 11 is a perspective view of the de-mated spray housing 20 and adaptor housing 80. As depicted in FIG. 11, the liquid chamber 30 may be filled by inverting the spray housing 20 and pouring the liquid to be sprayed within the liquid chamber 30.

FIG. 12 is a perspective view of the mated spray housing 20 and adaptor housing 80. The adaptor housing 80 seals the liquid within the spray housing 20. The liquid may thus be stored within the assembly until the spray task is performed. Also depicted in FIG. 12 are seal 90, female threads 88, and spike 54.

FIG. 13 is a perspective cutaway view of the spray housing 20, the adaptor housing 80, and propellant housing 60 mated together. As depicted in FIG. 13, the O-ring 74 is compressed between the mated spray and adaptor housings. The seal 90 is compressed between the mated adaptor housing 80 and propellant housing 60. The spike 54 extends into the propellant housing 60 and pierces into, or actuates a valve within, the propellant housing.

FIG. 14 is a perspective cutaway view of another alternative embodiment of the present invention. The embodiment of FIG. 14 uses a spray housing 20 which is engaged with an adaptor housing 80. The adaptor housing 80 is then engaged with the propellant housing 60. Unique to this embodiment, the propellant housing 60 holds a plurality of CO2 propellant cartridges. The configuration of the device is otherwise similar to the device of FIG. 8.

FIG. 15 is a perspective cutaway view of the spray device of FIG. 14 depicting the adaptor housing 80 disengaged from the spray housing 20, and the propellant housing 80 disengaged from the adaptor housing 80. Also shown are propellant cartridges 96. The propellant cartridges are CO2 cartridges as are readily known to those skilled in the art. The propellant housing 80 is configured to position a single propellant cartridge 96 along the central axis of the device. Multiple additional spare CO2 cartridges may be stored within the propellant housing 80. The spare CO2 cartridges are therefore readily available when the active CO2 cartridge is exhausted. The exhausted CO2 cartridge may be removed, and a fresh cartridge installed by unscrewing the propelling housing 60 from the adaptor housing 80. The liquid to be sprayed remaining sealed within the spray and adaptor housing assembly thereby precluding spills or contamination or the liquid.

FIG. 16 is a perspective cutaway view of the spray device of FIG. 14 depicting the propellant housing 60 disengaged or de-mated from the adaptor housing 80. Female threads 66 on the interior of the propellant housing 60 are configured to engage with male threads 88 on the interior of the adaptor housing 80. A seal 90 is captured within the adaptor housing 80. The adaptor housing 80 again has spike 54 which extends out along the central axis of the housing. The spike is in fluid connection with the propellant supply tube 50. As the propellant housing 60 is fully engaged with the adaptor housing 80, the spike 54 pierces the propellant cartridge 96. The seal 80 may be of a compression or gasket type, or may be of an O-ring configuration, or a combination of the two, or may be of any other configuration as are readily known to those skilled in the art.

As will be appreciated by those skilled in the art, CO2 propellant cartridges are available in smooth neck and threaded neck configurations. In an alternative embodiment of the present invention, a CO2 propellant cartridge having a threaded neck is used. Male threads on the periphery of the propellant cartridge 96 are configured to engage with female threads on the interior of the adaptor housing 80 in a configuration similar to the embodiment of FIG. 10 wherein the propellant housing is replaced with the threaded CO2 propellant cartridge 96. As the propellant cartridge 96 is engaged with the adaptor housing 80, hollow spike 54 pierces into propellant cartridge 96 thus supplying the propellant to the liquid chamber as in prior embodiments.

FIG. 17 is a perspective cutaway view of the spray device of FIG. 14 depicting the spray housing 20, the adaptor housing 80, and propellant housing 60 mated together. The seal 90 is compressed between the mated adaptor housing 80 and propellant cartridge 96. As the propellant housing 60 is engaged with the adaptor housing 80, hollow spike 54 pierces into propellant cartridge 96 thus supplying the propellant to the liquid chamber as in prior embodiments.

While there has been shown a preferred embodiment of the present invention, it is to be understood that certain changes may be made in the forms and arrangement of the elements of the reusable spray apparatus without departing from the underlying spirit and scope of the invention.

What is claimed is:

1. A portable and reusable liquid spray apparatus, the spray apparatus configured to spray a liquid onto any surface wherein:
   - an adaptor housing is included, the adaptor housing configured to engage a spray housing, when engaged the adaptor housing forming a first seal with the spray housing, the first seal precluding spillage of the liquid from the liquid chamber;
   - the adaptor housing further configured to engage a propellant housing, wherein when engaged the propellant housing forming a second seal with the adaptor housing, the second seal precluding leakage of propellant into the atmosphere;
   - the adaptor housing further comprising a passage to supply the propellant into the liquid chamber of the spray housing;
   - the spray housing forming a liquid chamber therein, the liquid chamber comprising an opening into which a liquid can be received, the liquid being retained within the liquid chamber;
   - the propellant housing configured to engage the spray housing, when engaged the propellant housing forming a first seal with the spray housing, the first seal precluding spillage of the liquid from the liquid chamber;
   - the propellant housing configured to hold a propellant within a propellant chamber, the propellant having a pressure above atmospheric pressure;
   - the propellant housing further configured to form a second seal when engaged with the spray housing, the second seal precluding leakage of the propellant into the atmosphere;
   - the spray housing further comprising a passage to supply the propellant into the liquid chamber;
   - the spray housing further comprises a spray valve and a spray nozzle, the spray valve configured for releasing the liquid from the apparatus thru the spray nozzle;
   - wherein the spray housing comprises a spike to release the propellant from the propellant chamber and into the passage within the spray housing supplying the propellant into the liquid chamber, when the propellant housing is engaged with the spray housing;
   - wherein the spike punctures the propellant chamber when the propellant housing is engaged with the spray housing;
   - wherein the spike actuates a valve within the propellant housing releasing the propellant from the propellant chamber when the propellant housing is engaged with the spray housing;
   - and
   - wherein when liquid to be sprayed is poured into the liquid chamber and the propellant housing is engaged with the spray housing, when the spray valve is actuated, the propellant forces the liquid thru the spray nozzle and out of the apparatus.

2. The spray apparatus of claim 1, wherein the liquid chamber holds liquid versus the liquid can.

3. The spray apparatus of claim 1, wherein the propellant comprises an aerosol having a boiling point lower than 60 degrees Fahrenheit at atmospheric pressure.

4. The spray apparatus of claim 3, wherein the aerosol comprises at least one of; chlorofluorocarbon, propane, n-butane, isobutene, dimethyl ether, methyl ethyl ether, nitrous oxide, carbon dioxide, or hydrofluoroalkanes.

5. The spray apparatus of claim 1, wherein the propellant comprises a pressurized gas.

6. The spray apparatus of claim 5 wherein the propellant cartridge is a CO2 cartridge.

7. The spray apparatus of claim 1, wherein the pressurized gas comprises at least one of; carbon dioxide, argon, nitrogen, or helium.

8. The spray apparatus of claim 6, wherein the pressurized gas is supplied by a CO2 cartridge.

9. The spray apparatus of claim 1, wherein the first seal comprises an O-ring between the spray housing and the propellant housing.

10. The spray apparatus of claim 1, wherein the second seal comprises an O-ring between the spray housing and the propellant housing.

* * * * *